April 28, 1970   M. J. WRIGHT   3,509,444
BATTERY CHARGING SYSTEMS FOR USE IN ROAD VEHICLES
Filed July 5, 1967   2 Sheets-Sheet 1

April 28, 1970   M. J. WRIGHT   3,509,444
BATTERY CHARGING SYSTEMS FOR USE IN ROAD VEHICLES
Filed July 5, 1967   2 Sheets-Sheet 2

United States Patent Office 3,509,444
Patented Apr. 28, 1970

3,509,444
BATTERY CHARGING SYSTEMS FOR USE IN
ROAD VEHICLES
Maurice James Wright, Harborne, Birmingham, England,
assignor to Joseph Lucas (Industries) Limited, Birmingham, England, a British company
Filed July 5, 1967, Ser. No. 651,163
Claims priority, application Great Britain, July 8, 1966,
30,721/66
Int. Cl. H02j 7/00
U.S. Cl. 320—48          4 Claims

ABSTRACT OF THE DISCLOSURE

A battery charging system for a road vehicle includes a generator for charging the battery, a voltage regulator R for controlling the generator output, a resistance connected in series with the voltage regulator R across the battery, an ignition switch connected in series with electrical loads of the vehicle in parallel with the series connection of voltage regulator and resistance, a switch separate from but controlled by the ignition switch for ensuring that the voltage regulator dissipates power only when the ignition switch is closed, and means operable when the generator is producing an output for short-circuiting the resistance.

---

This invention relates to battery charging systems for use in road vehicles.

A battery charging system according to the invention comprises a generator for charging the battery, a voltage regulator for controlling the generator output, a resistance connected in series with said voltage regulator across the battery, an ignition switch connected, in series with electrical loads of the vehicle, in parallel across the series connection of voltage regulator and resistance, a switch separate from but controlled by the ignition switch for ensuring that the voltage regulator dissipates power only when the ignition switch is closed, and means operable when the generator is producing an output for effectively short-circuiting said resistance.

Figure 1:
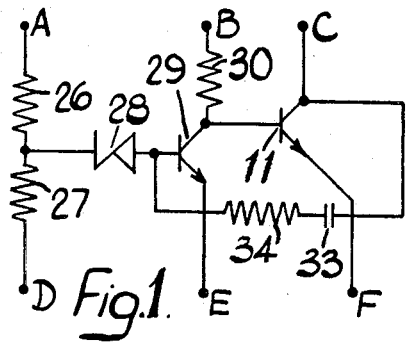
Figure 2:
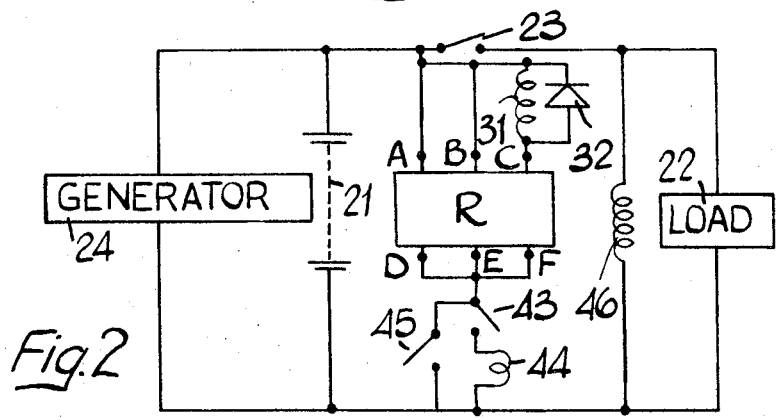
Figure 3:
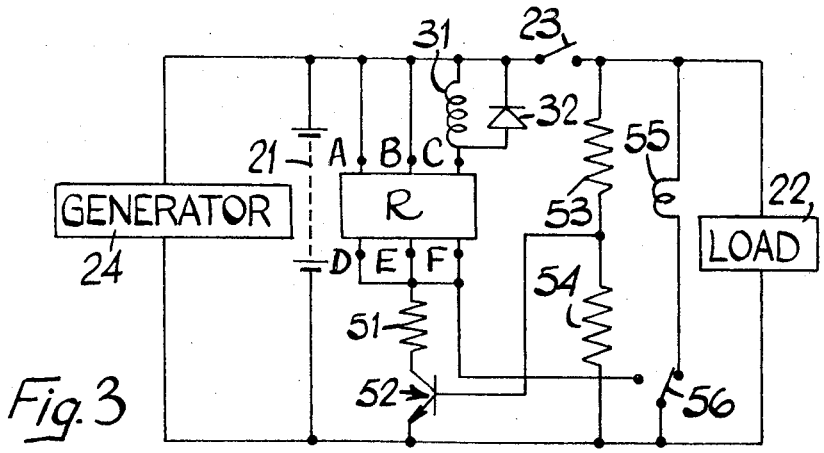
Figure 4:
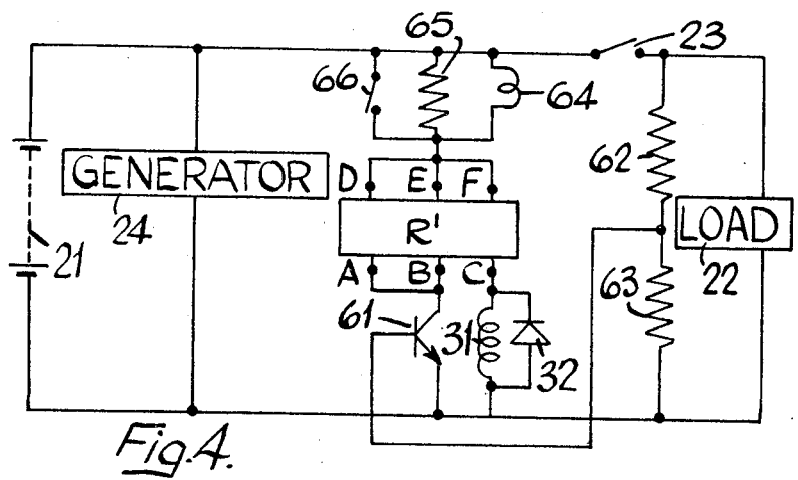

In the accompanying drawings, FIGURE 1 is a circuit diagram illustrating a known form of voltage regulator which can be employed in the invention, and FIGURES 2 to 4 are circuit diagrams illustrating three examples of the invention.

Referring to FIGURE 1, the regulator shown includes terminals A, B, C which in use will be connected to a positive supply, and terminals D, E, F which in use will be connected to a negative supply. Connected in series between the terminals A, D are a pair of resistors 26, 27, a point intermediate which is connected through the cathode-anode path of a Zener diode 28 to the base of an n-p-n transistor 29, the emitter of which is connected to the terminal E and the collector of which is connected to the terminal B through a resistor 30. The collector of the transistor 29 is also connected to the base of a second n-p-n transistor 11, the emitter of which is connected to the terminal F and the collector of which is connected to the terminal C. The collector of the transistor 11 is coupled to the base of the transistor 29 through a capacitor 33 and a resistor 34 in series.

In use, the terminal C is normally coupled to the positive supply through the field winding of a generator charging a battery. Where the battery voltage is below a predetermined value, the Zener diode 28 does not conduct, and current flow through the resistor 30 in the base-emitter path of the transistor 11 to turn the transistor 11 on so that full field current flows. However, when the predetermined battery voltage is reached, the Zener diode 28 conducts, and turns the transistor 29 on. The transistor 29 now removes the base current from the transistor 11 which starts to turn off, and by virtue of the feedback connection through the capacitor 33 and resistor 34, the circuit oscillates between one state with the transistor 29 on and the transistor 11 off, and a second state with transistor 11 on and the transistor 29 off, the mark-space ratio being determined by the current flowing through the Zener diode 28, which in turn is determined by the battery voltage. The average current flow in the field winding is controlled so that the battery voltage is maintained substantially constant.

In the following descriptions, the regulator shown in FIGURE 1 is indicated by the reference letter R. A regulator working in exactly the same way can be constructed by using opposite polarity transistors and reversing the connections of the Zener diode 28, and then connecting terminals D, E, F to the positive supply and terminals A, B, C to the negative supply. Such a regulator will be referred to as the regulator R$^1$. It must be emphasized that the invention is applicable to a large variety of regulators, of which FIGURE 1 illustrates one example merely for convenience. In the circuits to be described, it will readily be apparent how regulators operating in different manners could be coupled in the circuit so that the circuit works in a similar manner to the actual circuit to be described.

Referring to FIGURE 2, the terminals A, B are connected directly to the positive battery terminal, the terminal C is connected to the positive battery terminal through the winding 31, and the terminals D, E, F, are interconnected and connected to the negative battery terminal through a relay contact 43 and a resistor constituted by the warning lamp 44 in series, the contact 43 and lamp 44 being bridged by a switch 45 which is controlled by the generator so as to close when the generator is producing an output. The contact 43 is operated by a relay coil 46 connected across the battery in series with the ignition switch 23.

The arrangement is such that before the ignition switch 23 is closed, no current flows in any part of the circuit because the switch 45 and contact 43 are both open. When the coil 46 is energised on closing of the ignition switch 23, the contact 43 is closed, and the warning lamp is illuminated. At this point the transistor 29 conducts, and current flow through the resistance chain 26, 27 is through the contact 43 and warning lamp 44. However, as soon as the generator produces an output, the switch 45 closes, so that the resistance chain is connected directly across the battery and field current is no longer limited by the resistance of the warning lamp. Closing of the switch 45 also short-circuits the warning lamp 44, which is therefore extinguished.

In a modification, the relay coil 46 and the coil controlling the switch 45 are part of the same relay, and the switches 43, 45 utilise a single movable contact having three positions. When the coil 46 alone is energised, the contact moves from its off position to a position in which it completes a circuit through the lamp 44, but when both coils are energised, the contact moves to a second position in which it short-circuits the lamp 44. The operation is, of course, the same as FIGURE 2.

In another modification of FIGURE 2 the contact 43 and the coil 46 are omitted, the contact 43 being replaced by the collector-emitter path of an n-p-n transistor, the base of which is connected to the positive battery terminal through a resistor in series with the switch 23. The operation is identical to FIGURE 2. In this modification, the contact 45 can, where the generator is an alternator, be omitted, and replaced by a connection through one or more diodes to the phase or phases of the alternator. In this example, the regulator first receives its power supply from the battery through the warning lamp, but when the generator is producing an output, the regulator supply is direct from the generator, the potential at the junction of the regulator and the warning lamp 44 rising to a value such that the warning lamp is effectively short-circuited and so is extinguished.

In the examples given it may be desirable to connect a resistor across the warning lamp to ensure the circuit is completed should the warning lamp fail and become open circuited.

Referring to FIGURE 3, the connections of the terminals A, B, C, are similar to those shown in FIGURE 2, and the terminals D, E, F, are interconnected and connected to the negative battery terminal through a resistor 51 in series with the collector-emitter path of an n-p-n transistor 52. The base of the transistor 52 is connected to the junction of a pair of resistors 53, 54 connected in series with the ignition switch 23 between the battery terminals, and the circuit further includes a generator controlled switch 56 which, when the generator is not producing an output, completes a circuit between the battery terminals through the ignition switch 23 and a warning lamp 55, but when the generator is producing an output short-circuits the resistor 51 and the collector-emitter of the transistor 52.

In operation, no current flows when the ignition switch is open because the transistor 52 is off. On closing of the ignition switch 23, the transistor 52 is turned on to provide power to the regulator R. At the same time, the warning lamp 55 is illuminated. When the generator is producing an output, the regulator connection is completed through the switch 56, and at the same time the warning lamp 55 is extinguished.

FIGURE 4 illustrates an example using a regulator $R^1$. The terminal C is connected to the negative battery terminal through the winding 31, and the terminals A, B are connected to the negative battery terminal through the collector-emitter path of an n-p-n transistor 61. The base of the transistor 61 is connected to the junction of a pair of resistors 62, 63 connected across the battery terminal in series with the ignition switch 23. The terminals D, E, F, are interconnected, and are connected to the positive battery terminal through three parallel paths containing respectively a warning lamp 64, a resistor 65 and a generator-controlled switch 66. Either the resistor 65 or the warning lamp can be omitted.

In operation, the transistor 61 only conducts when the ignition switch 23 is closed, and the circuit to the regulator and field winding is then completed through the warning lamp 64 and resistor 65, so that the warning lamp 64 is illuminated. The switch 66 closes when the generator produces an output, so short-circuiting the warning lamp 64.

All the arrangements described have the advantages that the voltage sensing network is not affected by errors resulting from the ignition switch, even though the ignition switch still prevents dissipation of power by the regulator when the switch is open. The initial partial energisation through a resistance is found to be advantageous for many applications, and where, as is preferred, the resistance is a warning lamp, an indication that the generator is producing an output is given in a convenient and simple manner.

Having thus described my invention what I claim as new and desire to secure by Letters Patent is:

1. A battery charging system for a road vehicle, comprising a generator for charging the battery, a voltage regulator for controlling the generator output, a resistance connected in series with said voltage regulator across the battery, an ignition switch connected in series with electrical loads of the vehicle, in parallel across the series connection of voltage regulator and resistance, a switch separate from but controlled by the ignition switch for ensuring that the voltage regulator dissipates power only when the ignition switch is closed, and means operable when the generator is producing an output for effectively short-circuiting both said resistance and the switch controlled by the ignition switch.

2. A system as claimed in claim 1 in which the resistance is a warning lamp.

3. A system as claimed in claim 1 in which the resistance is a resistor, the system further including a warning lamp and the means operable by the generator comprising a switch which short-circuits the resistor when the generator is producing an output, but which when the generator is not producing an output completes a circuit to the warning lamp through the ignition switch.

4. A battery charging system for a road vehicle, comprising a generator for charging the battery, said generator incorporating a field winding, a voltage regulator for controlling the generator output, said voltage regulator including an output transistor connected in series with said field winding, an input transistor, means whereby conduction of said input transistor controls conduction of said output transistor to vary the current flowing in said field winding, a resistance chain sensing the output voltage of said battery, and a Zener diode coupling said resistance chain to the base of said input transistor to control conduction of said input transistor, the system further including a resistance connected in series with the entire voltage regulator across the battery, an ignition switch connected in series with electrical loads of the vehicle in parallel across the series connection of voltage regulator and resistance, a switch separate from but controlled by the ignition switch for ensuring that the voltage regulator dissipates power only when the ignition switch is closed, and means operable when the generator is producing an output for effectively short-circuiting said resistance.

References Cited
UNITED STATES PATENTS

| | | | |
|---|---|---|---|
| 2,908,854 | 10/1959 | Rice | 320—48 X |
| 3,202,901 | 8/1965 | Peras | 320—48 |
| 3,210,645 | 10/1965 | Domann | 322—28 |
| 3,247,443 | 4/1966 | Brayley et al. | 320—68 |
| 3,321,754 | 5/1967 | Grimm et al. | 340—249 |

J. D. MILLER, Primary Examiner

J. M. GUNTHER, Assistant Examiner

U.S. Cl. X.R.
320—64; 322—28, 83, 99